United States Patent [19]
Sherer et al.

[11] 3,807,047
[45] Apr. 30, 1974

[54] PIPE CUTTING DEVICE
[75] Inventors: C. Richard Sherer, Elmhurst, Ill.;
Russell M. Foyle, Houston, Tex.
[73] Assignee: DND Corporation, Houston, Tex.
[22] Filed: Jan. 27, 1972
[21] Appl. No.: 221,213

[52] U.S. Cl............. 30/97, 30/101, 82/4 C, 82/60, 82/72
[51] Int. Cl............. B23b 5/08, B26d 3/16
[58] Field of Search.......... 30/97, 94, 95, 101, 91.2; 82/4 C, 59, 60, 66, 70.1–77

[56] References Cited
UNITED STATES PATENTS
| | | | |
|---|---|---|---|
| 2,769,234 | 11/1956 | Young | 30/97 |
| 3,149,440 | 9/1964 | Maguire | 82/72 X |
| 3,651,659 | 3/1972 | Arnot | 30/95 |
| 2,271,582 | 2/1942 | Dixon | 30/97 |

FOREIGN PATENTS OR APPLICATIONS
193,269  8/1967  U.S.S.R................. 82/70.1

Primary Examiner—Al Lawrence Smith
Assistant Examiner—K. J. Ramsey

[57] ABSTRACT

A pipe cutting device comprises a split frame which may be clamped around the circumference of a pipe. Floatingly or freely mounted on rollers carried by the frame, to rotate about the pipe is a ring gear having a pair of arcuate arms mounted thereon and rotating. At one end, the pair of arms are pivotally mounted together. At the other end, the arms are selectively drawn together by a discrete amount under the control of an air or hydraulic piston. This way, a blade mounted on one of the arms may be driven into the pipe by a controlled amount.

17 Claims, 7 Drawing Figures

PIPE CUTTING DEVICE

This invention relates to automatic pipe cutters, and more particularly to pipe cutters which may be adapted for cutting virtually any size pipe, with virtually any bevel, and with a cutter overload release.

Prior pipe cutting devices have included a circular cutter frame which may be clamped around the outside circumference of a pipe, at any desired location. In these devices, a suitable pipe cutting blade may be rotated around the circumference of the frame. As the blade turns, it is advanced radially inwardly toward the center of the pipe, thereby increasing the depth of the cut. The blade is also held at a suitable angle, which bevels the pipe to receive a welding bead when several cut sections are later joined together.

Usually, pipes of the contemplated type are not perfectly circular in cross section since their manufacturing tolerances are not that accurate. Therefore, it is a common practice to provide a spring bias or similar means, for holding the blade inwardly by an amount which is fixed with respect to the eccentricity of the pipe. Thus, the blade is supposed to move around the circumferential surface of the pipe. As a result, the depth of the cut is supposed to be uniform, with respect to the outside surface of the pipe, regardless of the circumferential departures from a purely circular cross section.

The conventional method of forcing the blade inwardly is to provide the blade with a predetermined cutting force. Both the spring and the blade are supported by an arm which rides on a roller engaging the outer periphery of the pipe. This way, the blade support always remains at a uniform distance away from the outside pipe surface; although, the radial blade position is spring biased with respect to the support position.

This method of blade or cutting tool support and spring bias generally presents three problems. First, a spring acts in either of two directions, i.e., it may compress or extend. Thus, the spring may either be pulled in so that the blade makes a deeper cut or stretched out to allow the blade to bounce or slide out of contact with the pipe. Second, there is no automatic way of adjusting the spring bias while in operation. The blade is urged with a fixed pressure established by the spring constant, regardless of the pressure actually required for the given pipe cutting condition. Third, there is no safety feature wherein excess pressure upon the blade may be relieved when there is an overcrowding condition, as when a blade binds during pipe cutting.

Accordingly, an object of the invention is to provide new and improved pipe cutting devices. Here, an object is to provide a pipe cutting device which may cut pipe of virtually any diameter and with a wide range of bevel angles and types.

Another object of the invention is to provide a pipe cutter which applies a predetermined and controlled pressure upon the cutting blade or tool. Here, an object is to enable the application of any suitable pressure upon the pipe cutting blade. A further object is to enable an automatic relief of excess pressure on the cutting blade, responsive to overload conditions.

In keeping with an aspect of the invention, a pipe cutting device comprises a frame which may be clamped around a pipe of virtually any diameter. A pair of arcuate arms, which may be pivotally attached together at one end, are held together at the other end by an air or hydraulic piston. As the arms move in to embrace the pipe, a blade register roller is pressed or forced against the pipe by a selected pressure controlled by the piston. The piston may be controlled by any suitable contour sensors, preferably in the form of a roller riding on the outer circumference of the pipe. This way, the blade or tool may always take a cut of fixed depth, regardless of any eccentricity of the pipe periphery.

Preferred and exemplary embodiments for accomplishing these and other objects, may be understood best from a study of the attached drawings wherein.

The major assemblies of the inventive device (FIGS. 1, 2, 3, and 6) are a frame 20, pipe gripping clamps 21, 22, 23, a ring gear 26, a power source 24, and a pipe cutting tool assembly 25. The allowable variations in the outside diameters of the pipes being cut depend upon the space between the clamps 21, 22, 23, and the amount of clamp travel. In principle, a pipe cutting device having the inventive design may be constructed to fit around pipes of any suitable size ranging from, say, two inches to about ten or more feet in diameter.

Figure 3:
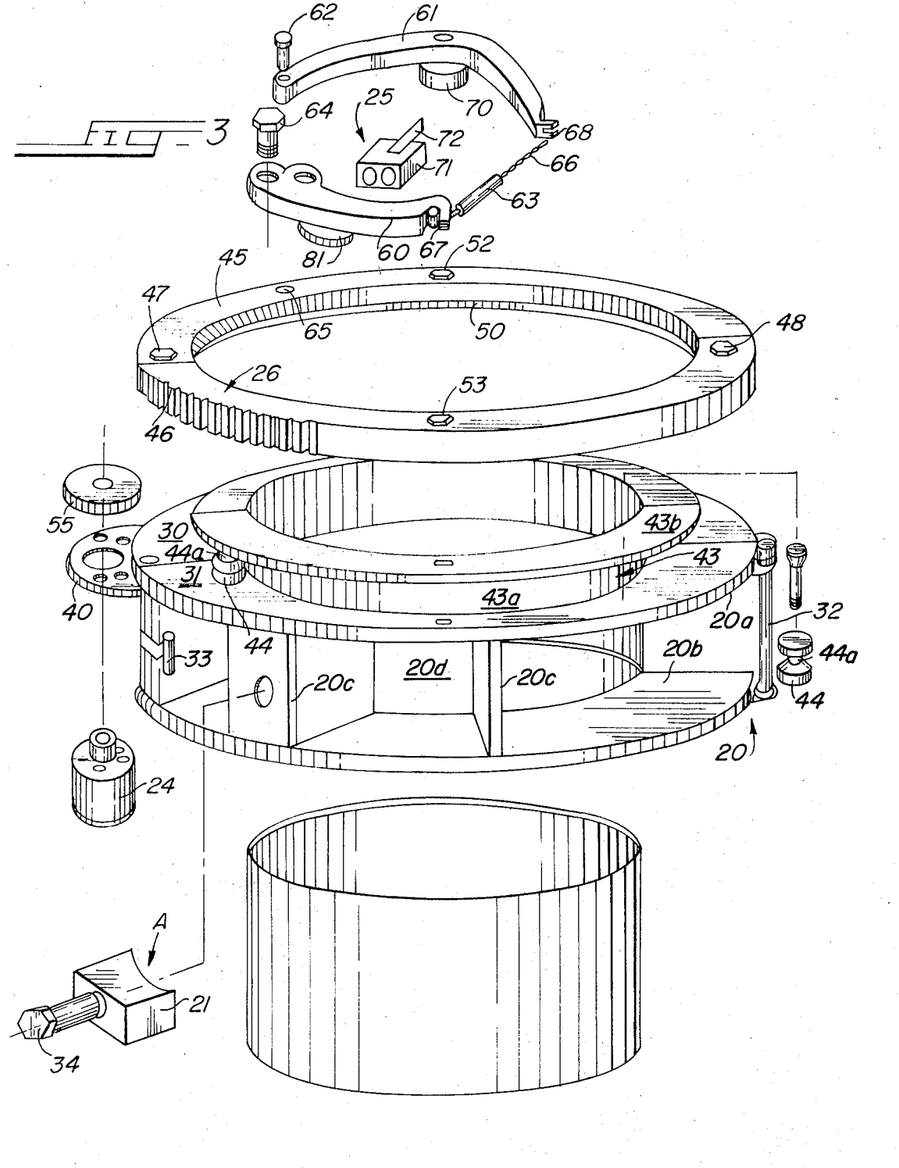
FIG. 3 is an exploded view of a first embodiment of the inventive pipe cutting device especially adapted for use with smaller size pipes.
Figure 6:
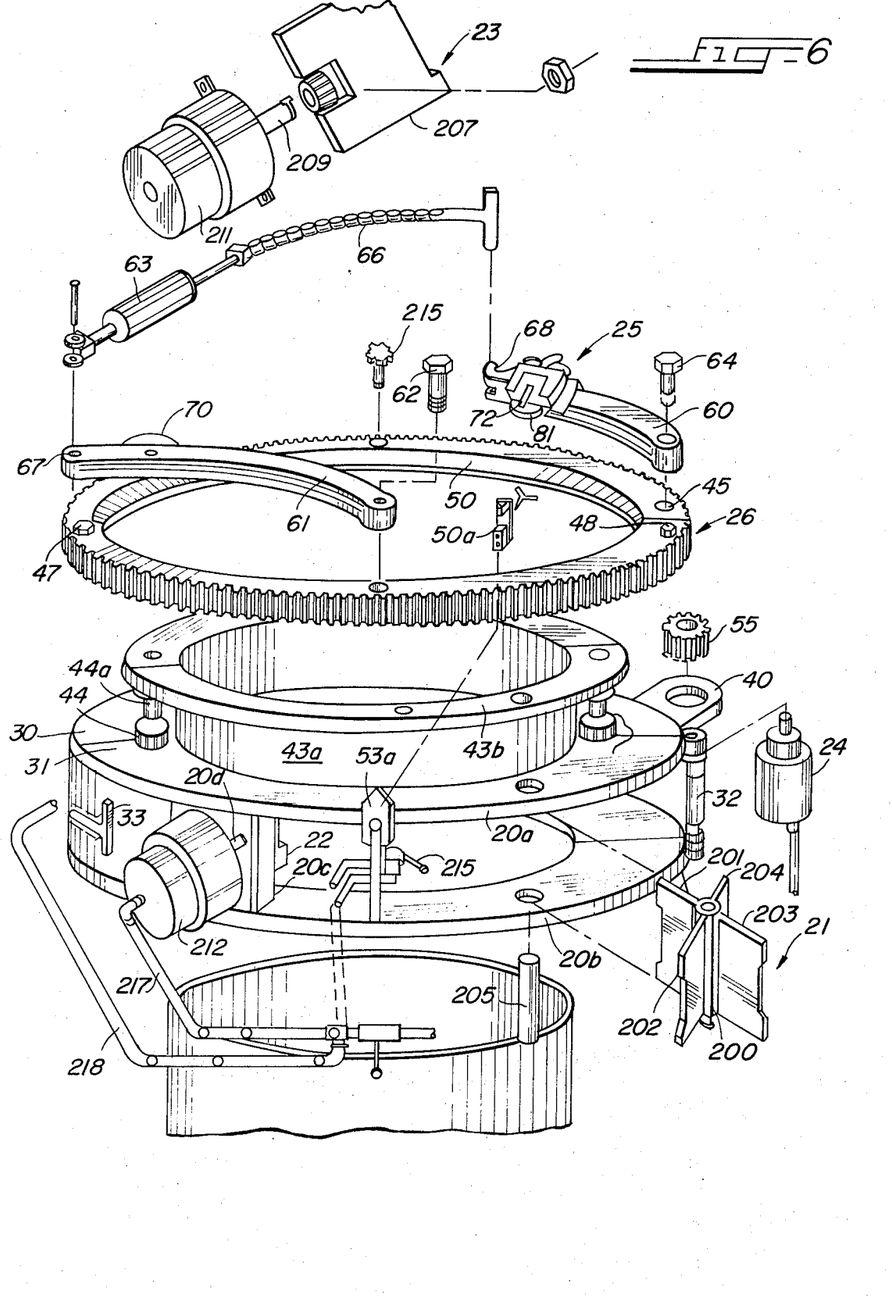
FIG. 6 is an exploded view of a second and preferred embodiment of the invention especially adapted for use on larger pipes.

The frame 20 is a split cylindrically shaped unit having two or more arcuate circular sections 30, 31 pivotally joined together at a pivot point 32. As best seen in FIGS. 3 and 6, the frame 20 has upper and lower annular plates 20a, 20b, respectively, held in spaced parallel relationship by a plurality of radial spacer plates, such as 20c. The areas 20d between radial plates 20c form guideways for receiving and supporting clamps 21–23. The frame may thus be described as having a somewhat squirrel cage configuration.

Thus, the frame may be spread or pivoted apart on the axle 32. Then, after the frame is spread apart, it is thereafter fitted over the pipe at any convenient location. The sides may then be brought together and clamped in place on the pipe by any suitable means 33, such as an overcenter clamp, or the like. Preferably, this clamp includes a crossbar which rests upon a wear resistant seat on the frame.

Figure 1:
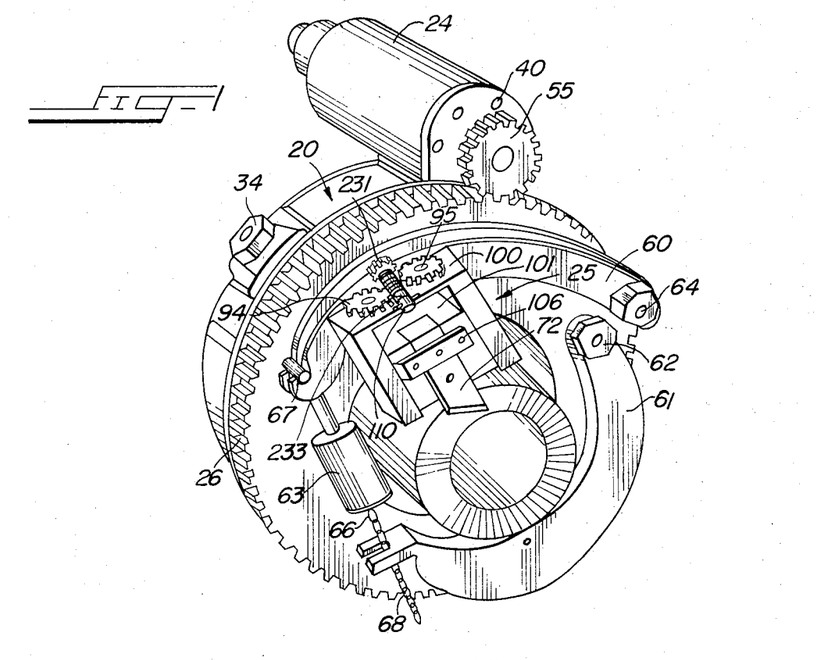
FIG. 1 is a perspective view of one embodiment of the invention especially well adapted for use on smaller diameter pipes, the figure showing a cutter body, motor, and a blade actuation device.
Figure 2:
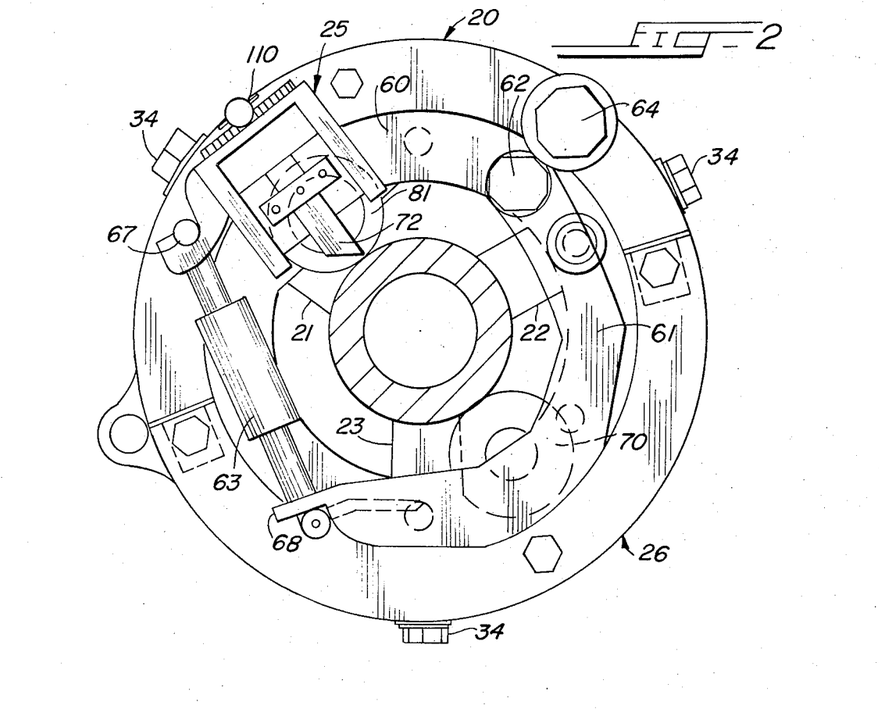
FIG. 2 is a plan view of the end of the pipe cutting device of FIG. 1, clamped onto a pipe.

After the frame is so clamped onto the pipe, a radially positioned bolt 34 (the first embodiment, FIG. 3) associated with each of the clamps 21, 22, 23, is turned to drive the clamp inwardly and radially toward the axis of the frame, as best seen in FIG. 2. While many different clamp structures may be used, a preferred form includes a rectangular block having an arcuate surface A, shaped to match an average circumferential arc of a pipe to be cut. The block is drilled and tapped to receive the end of the bolt 34. Therefore, a turning of the bolt 34 advances or retracts the clamp 21 into or out of engagement with the circumference of the pipe. Any suitable gauging means may be provided to assure the concentric relationship between the pipe and the frame 20. After the frame is so clamped into position on the pipe, the frame becomes a rigid support for the pipe cutting blade.

In the second embodiment (FIG. 6), at least two of at least three clamps 21-23 comprise a rotatably vertical post 200 turning about axle 205 and having a plurality of radially positioned plates or fins 201-204, of different radial widths welded thereto. Thus, as these clamps are rotated on the shaft 205, different diameters of pipes may be accommodated and centered. The remaining power actuated clamps comprise a clamping plate 207, 208, connected to the ends of rods 209, 210, respectively, and driven by an air or hydraulic cylinder 211, 212. Valve 215 applies the line pressure from a pipe system 217, 218 to the cylinders 211, 212. Thus, the embodiment of FIG. 6 provides power clamping means which automatically centers the pipe according to the fixed rotational postiion of the clamps, such as 21. This embodiment is especially attractive for use in connection with larger diameter pipes, in which case it may have built-in lifting eyes or hooks.

While the drawing shows three clamps 21-23, any suitable number of clamps may be provided. For example, an eight foot pipe may have twelve or more clamps; whereas, a four inch pipe may require only three clamps. In the embodiment of FIG. 6, for example, a 36 inch diameter pipe may have three fixed clamps (such as 21) and three power actuated clamps (such as 23). Also, the inside of the arcuate surfaces A of the clamps (or the ends of plates 201-204, 207, and 208) may be serrated, knurled, grooved, or sand-blasted to increase the friction at the gripping surface.

Another element of the frame 20 is an integral mounting bracket 40 for supporting a motor 24, of any suitable design. Thus, for example, the motor 24 could be an electric, air, or hydraulic motor. A hand crank may also provide the motive power. In any event, the motor may be attached to the bracket in any suitable manner, as by means of screws, bolts or rivets.

On its outside end the frame has a circumferential groove 43 with a plurality of equispaced rollers 44 positioned in the root of the groove and mounted in any suitable manner, as by means of thrust bearings and washers. In greater detail, the upper annular plate 20a (FIGS. 3 and 6) has integral therewith an upstanding cylindrical collar 43a terminating in an outwardly turned flange 43b. Thus, the collar 43a forms the bottom of the groove while plate 20a and flange 43b form the sides of the groove. The axles of the roller 44 are supported at their ends by flange 43b and plate 20a. Preferably, the rollers 44 have somewhat V or U-shaped circumferential grooves or notches 44a formed on them to provide means for centering and supporting the ring gear 26 in the groove 43. The number of rollers depends upon the size of the frame; however, no fewer than four rollers are normally used.

The ring gear 26 is preferably made in two parts 45, 46 which have overlapping and interlocking ends that are held together by means of two keeper bolts 47, 48.

The inside circumferential edge 50 of the ring gear 26 has a generally U-shape or V-shape that matches the U-shape or V-shape of the grooves or notches 44a. Thus, after the frame 20 is bolted in place, the ring gear may be separated, fitted over the grooves or notches 44a, and then bolted together by keeper bolts 47, 48. A pair of locking bolts 52, 53 may selectively immobilize or lock the ring gear 26 in place while the pipe cutting device is placed around and locked onto a pipe. Thereafter, the bolts 52, 53 may be removed during a cutting operation.

In the embodiment of FIG. 6, the same locking function may be performed by one or more suitable bracket and clamp assemblies 52a, 53a.

A pinion gear 55 transmits the power of the motor 24 to turn the ring gear 26. Therefore, as long as the motor operates, the ring gear rotates endlessly around the pipe. When the power source is disconnected from the motor, the rotation of the ring gear terminates.

The pipe cutting tool assembly 25 is mounted on two arcuate arms 60, 61 which are pivotally joined together (in the embodiment of FIG. 3) at one end by a bolt 62 and releasably clamped together at the other end by a hydraulic or air controlled piston 63. Also, a bolt 64 pivotally attaches the arcuate arms 60, 61 to the ring gear at the point 65. In the embodiment of FIG. 6, both arms 60, 61 may be coupled to the ring gear 26 and not to each other. The piston 63 may or may not have an elongation, such as a roller chain 66 associated therewith, depending upon the size of the pipe cutter and the diameter of the pipe being cut thereby. Thus, for example, a first piston 63, without the chain 66 (FIG. 2), may be used when a small diameter pipe is being cut. Thereafter, when the same tool is used to cut a large diameter pipe, another piston 63, with an elongating chain 66 (FIG. 3), may be used. The amount of elongation selects the cutting tool pressures applied by the cylinder. In like manner, any number of different piston and chain combinations may be provided.

To facilitate a quick and easy exchange of piston units, the ends 67, 68 of the arms 60, 61 may be made in the form of hooks. Thus, it is only necessary to hook one end of the piston 63 at 67 and the other end of the piston (or the chain) at 68.

According to an important aspect of the invention, the air or hydraulic pressure inside of cylinder 63 may be fixed at a predetermined or desired level. The cutting force is fixed by lengthening or shortening the chain to provide a balanced pressure between the two arms 60, 61. As the arms are brought together, the blade is plunged or pressed into the pipe at the predetermined pressure level. If, for any reason, the blade pressure exceeds the cylinder pressure (as when it binds, for example), the blade pushes against the cylinder with a greater force to lengthen the cylinder and thereby release the excessive pressure. Therefore, a cutting under any suitable and acceptable amount of blade pressure will be continued, but any excessive amount of blade pressure will be relieved immediately.

Each of the arms 60 and 61 has a roller 70 and 81, respectively, mounted thereon. In addition, the cutter arm 60 has a cutter arm assembly (FIGS. 4, 5, 7) mounted thereon. Thus, as the piston 63 operates to hold the arms 60, 61 together, the blade 72 is plunged into the pipe with the predetermined pressure. It is very important to note that the blade 72 is diametrically stabilized against the roller 70.

Thereafter, the motor 24 drives the ring gear 26, and the blade 72 is rotated around the pipe to score its outer circumference. During such rotation, both of the rollers 70 and 81 ride on the outside circumference of the pipe. Hence, the two arms 60, 61 pivot about the bolt 64 and the pivot point 65, as the rollers encounter circumferential eccentricities. In this manner, the blade 72 tends to float with respect to the periphery of the pipe due to the action of the cylinder 63, thereby maintaining a uniform depth of cut regardless of the non-circular characteristics of the pipe.

In the case of very large diameter pipes, the end of the arm 60 may be connected directly to the ring gear 26. One or more idler sprockets 215 (FIG. 6) may be mounted on the ring gear 26 to guide the piston 63 and the chain 66 into an arcuate path for connecting with the cutter arm 60.

Also important to the pipe cutting process is the variation in wall thickness, as a function of pipe diameter. Again, a 4 inch pipe will tend to have a more or less uniform wall thickness. However, an 8 foot pipe may have any wall thickness, ranging from a quarter-inch to 3 inches.

Acceptable tolerances on small diameter pipe are so small that "egging" is virtually non-existant. However, when combined with wall variations, handling damage, surface irregularities, and other non-uniformities, the egging can become a problem. Also, due to physical strength, the small diameter makes it more difficult to force the pipe scoring into a perfectly round configuration during the cutting process. Hence, a small pipe requires compensation for an out-of-round geometry.

Tolerances on large diameter pipe are much greater, wall thickness varies more, to cause a slight, but troublesome collapse of the tube. Therefore, it is very often more important for a larger diameter cutter to have an out-of-round compensation system.

Figure 4:
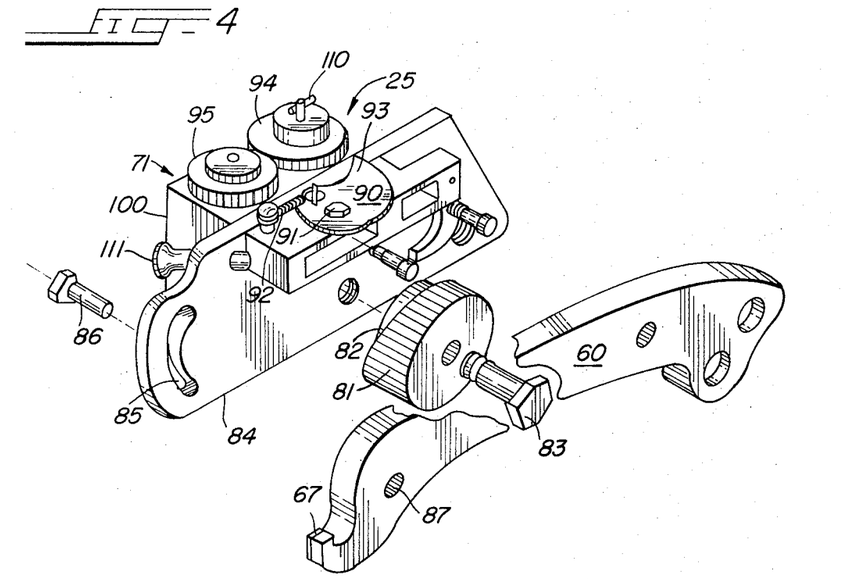
FIG. 4 is a perspective view of a first embodiment of a blade depth adjusting means for automatically and selectively increasing the depth of a cut, as the cutting progresses.
Figure 5:
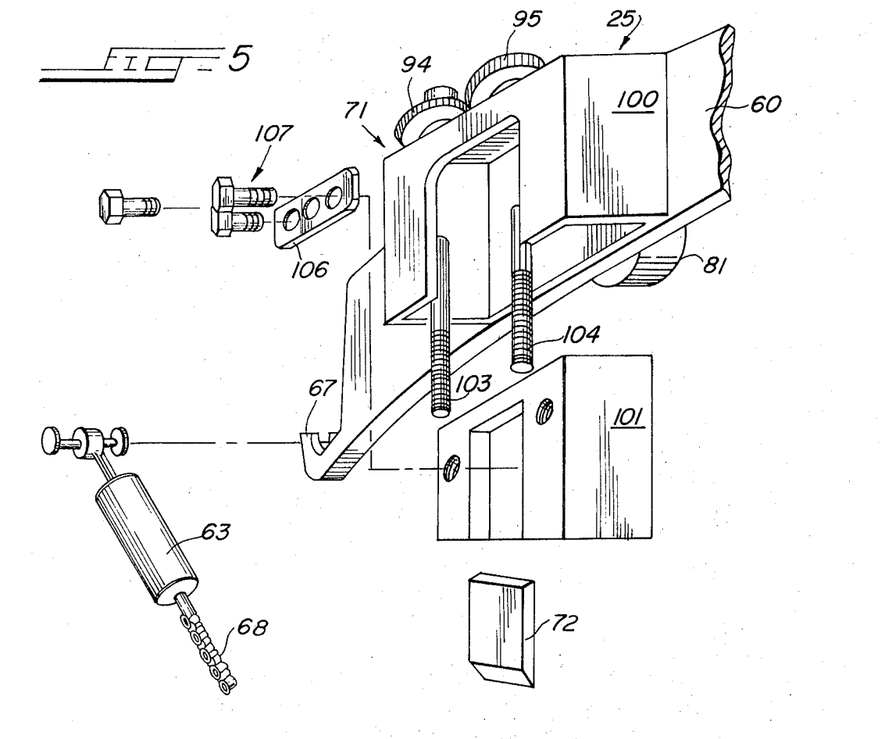
FIG. 5 is an exploded view of the blade depth adjusting means of FIG. 4.
Figure 7:
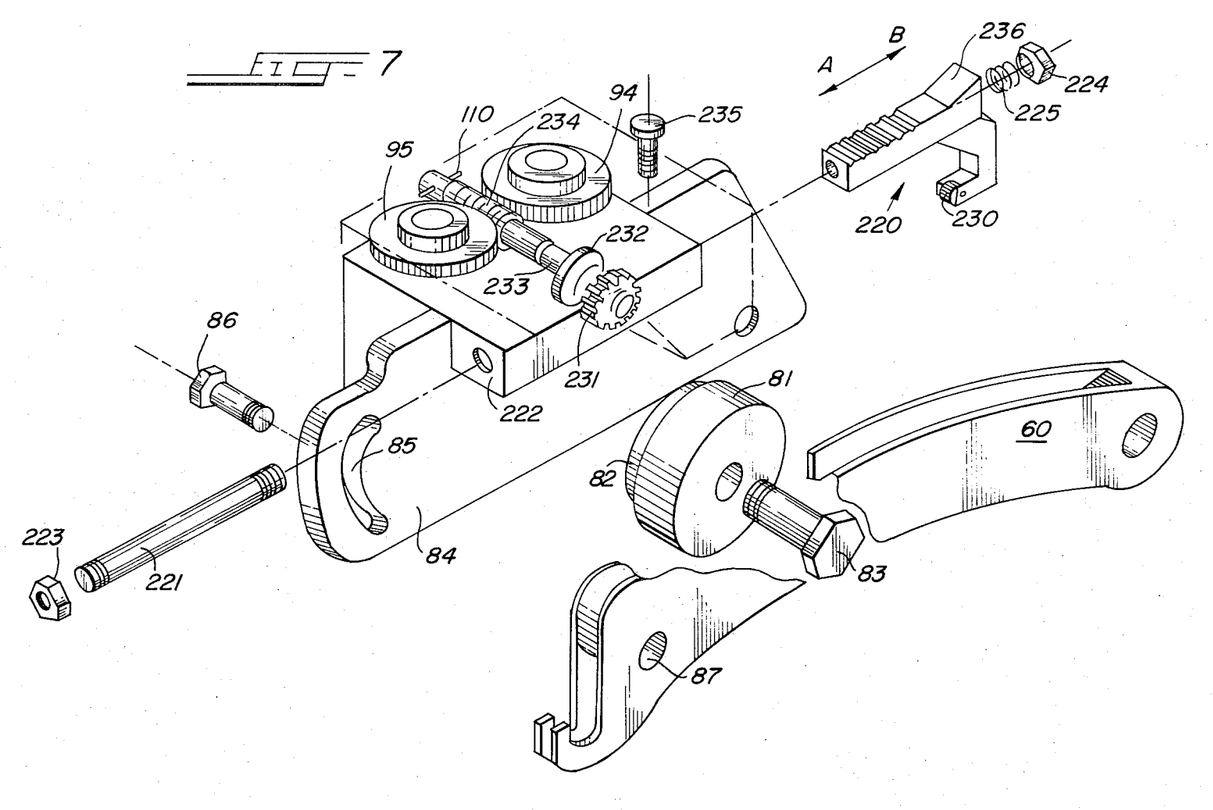
FIG. 7 is a perspective view of a second and preferred embodiment of a blade depth adjustment means for selectively increasing the depth of a cut, as the cutting progresses.

The nature of the blade support and advancement apparatus may be understood best from a study of FIGS. 4 and 5 (a first embodiment) and of FIG. 7 (a second embodiment). In greater detail, the arm 60 has a compound roller 81 rotatably mounted on an axle formed by a bolt 83. The adjacent side 82 of the compound roller 81 has an eccentric periphery. Thus, as the roller 81 turns, the eccentric periphery 82 causes a horizontal, reciprocal linear motion.

A horizontal blade support plate 84 is bolted to the arcuate arm 60, in any suitable manner. An elongated slot 85 receives a bolt 86 which is turned into a tapped hole 87. This way, the position of the plate 84 may be adjusted vertically on the arm 60. Also, as the plate 84 is so positioned, the angle of the blade is also changed, thereby providing an additional angle adjustment.

In the embodiment of FIG. 4, a linear cam member 90 is adjustably mounted on the support plate 84 by one or more bolts. On top of cam member 90 is an anchor point for a bias spring 92 which holds a spur tooth gear 93 in a normally retracted position. The outer right-hand side of the cam member 90 is shaped to cooperate with the eccentric periphery of the side 82 of roller 81. Thus, as the roller 81 runs on the outside circumference of the pipe being cut, the cam 90 moves reciprocally in a horizontal linear motion. The spur tooth 93, on the end of the cam 90, moves complementarily back and forth with the turning roller. The spur tooth 93 presses against and rotates a gear 94 by a predetermined angular distance, each time that roller 81 makes one complete revolution. The gear 95 meshes and turns with the gear 94.

In the embodiment of FIG. 7, a rack assembly 220 is mounted for reciprocally sliding in directions A, B on a shaft 221, secured in bracket 222 by means of nuts 223, 224. A spring 225 on the shaft 221 normally urges the rack assembly 220 in direction A. A roller on the rack 230 acts as a cam follower, riding on the cam 82. Thus, as wheel 81 rotates, a cam 82 drives rack assembly 220 in direction B, and thereafter spring 225 drives it back in direction A.

A pinion 231 is rotated with each forward rack motion, and thereafter clutch 232 disengages pinion 231 for each reverse motion. As the pinion is driven in its forward motion, it rotates a shaft 233 associated with a worm gear 234. The worm gear 234 turns the gears 94, 95. An adjustable screw 235 cooperates with a ramp section 236 on the rack assembly 220 in order to fix a selected amount of rack travel for each revolution of the wheel.

FIG. 5 includes an exploded view of the blade holder which may be used with minor modifications with either of the embodiments of FIGS. 4 or 7. This holder comprises a housing 100 forming a guideway for slidingly receiving a block 101. Mounted on the block 101 is the blade 72 used for cutting the pipe. The block 101 includes a pair of tapped holes for receiving the threaded ends of two bolts 103, 104. These bolts are integral and turn with the gears 94, 95. Thus, as the gears 94, 95 turn responsive to the movement of either the cam 90 or the worm gear 234, the bolts 103, 104 also turn to move the block 101 vertically (as viewed in FIG. 5). A plate 106 and one or more bolts 107 are used to assemble and hold the parts together, as a unit.

Upon reflection, it should be apparent that as the ring gear 26 turns, the roller 81 rolls on the outer circumference of the pipe, and the block 101 repeatedly moves downwardly by an incremental amount, thereby deepening the cut.

The top of the shaft associated with the gear 94, in the embodiment of FIG. 4, and the end of shaft 233, in the embodiment of FIG. 7, has a horizontal key 110 attached thereto. As the blade 72 reaches the end of the cut, the motor is stopped. The spring 92 holds the cam 90 away from the gear 94, or the clutch 232 disengages pinion gear 231. A tool may then be fitted over the key 110 and used to turn the gears and retract the blade.

In either of the embodiments (FIGS. 4 or 7), the bevel of the cut, the contour of the cut, or any other characteristic of the cut may be selected by the simple expedient of removing the blade 72 and substituting another blade. Thus, for exmaple, one blade may have an angle which cuts the pipe with a bevel of, say 45°. Another blade may have a cutting angle of, say 30°. The normal and usually adopted bevel angle is in the preferred range from about 17° to 38°. In like manner, any other suitable angle or contour may be provided by changing blade 72, as for example to cut the well known J bevel. In any event, the bevel is selected to provide a desired seat for receiving a welding bead when a plurality of pipe sections are joined together.

Briefly, in summary, the two arm (60, 61) system provides a means of applying cutting feed force which is sufficient to handle any type cut, without imparting axial loads onto the machine as a whole. The blade holder-cutter-arm assembly has a roller 81 mounted essentially 180° opposite the counter pressure roller 70. The cylinder 63 is pressurized to a point where it creates an equal force on both of the rollers 70 and 81, while the tool is operating under normal cutting conditions. The ring gear 26 now has only the task of pulling the tool around the pipe, with no loading of the gear against the rollers. As any out-of-round conditions are encountered by the blade register roller 81, the cylinder maintains a constant loading. However, it is elongated enough to prevent the tool from cutting any differently than its cuts during normal sections.

If an excess loading of the blade occurs, it rides up and removes the blade register roller 81 from its contact with the pipe. This causes the feed cam 90 or the rack 220 to stop moving. This, in turn, stops the downward feed of the blade 72, thereby allowing the tool to adjust itself to the cutting force necessary.

Some of the advantages of the inventive pipe cutter should now be apparent. The hydraulic or pneumatic piston 63 may be used to exert a selectively controlled force for holding the arms 60, 61 together, as required. If the blade pressure exceeds the cylinder's air or hydraulic pressure, the blade 72 releases. The blade angle is set independently so that any suitable weld seat may be provided, with no further facing or dressing required after the completion of the cut.

It should now also be apparent that in some embodiments, the piston 63 may be controlled to move at any desired speed or rate, thereby affecting the arms 60, 61 either quickly or slowly.

While specific embodiments have been described, it should be understood that any suitable modifications may be made therein. Hence, the appended claims are to be construed to cover all equivalent structures falling within the true scope and spirit of the invention.

We claim:

1. A pipe cutting device comprising a split frame having means for clamping said frame around the outside circumference of a pipe, ring gear means freely mounted on said frame for rotating about said pipe, cutter means, means carried by said ring gear for selectively causing said cutter means to apply any suitable cutting force to said pipe responsive to a rotation of said ring gear relative to said pipe, means for driving said ring gear to cause said cutting force to girdle said pipe, and means for advancing said cutter means into a deeper cutting relationship with said pipe, said advancing means comprising a wheel or roller riding on said pipe as said ring gear is driven, said wheel turning gears for feeding said cutter means radially into said pipe.

2. The device of claim 1 wherein said means carried by said ring gear comprises at least one arcuate arm pivotally attached to said ring gear and attached at the other end to said ring gear via said force applying means.

3. A pipe cutting device comprising a split frame having means for clamping said frame around the outside circumference of a pipe, ring gear means freely mounted on said frame for rotating about said pipe, cutter means, means carried by said ring gear for selectively causing said cutter means to apply any suitable cutting force to said pipe responsive to a rotation of said ring gear relative to said pipe, means for driving said ring gear to cause said cutting force to girdle said pipe, said means carried by said ring gear comprising a pair of arcuate arms, and said arms being pivotally connected to each other at one of their ends.

4. The device of claim 3 wherein said force applying means comprises a piston interconnecting the other ends of said arcuate arms, said piston applying a predetermined cutting force by biasing said arms toward each other and by overcoming said bias when said cutting force exceeds said predetermined amount.

5. The device of claim 4 wherein said cutter means includes a blade mounted on one of said arms, and means for fixing the cutting angle of said blade with respect to the axis of said frame.

6. The device of claim 5 wherein said angle fixing means comprises a predetermined contour on said blade.

7. The device of claim 5 and roller means mounted on both of said arms diametrically opposite each other and in line with said blade.

8. The device of claim 7 and compound roller means mounted on said one arm, said roller means having a first periphery for rolling on the outside circumference of said pipe and a second periphery shaped to produce reciprocating linear motion, and means responsive to said linear motion for incrementally advancing said blade.

9. A pipe cutting device comprising a split squirrel cage frame having a groove on one end with roller bearings at the root of said groove, ring gear means mounted in said groove on said roller bearings, means comprising a pair of arcuate arms carrying a cutting blade, said arms being pivotally attached to said ring gear, and pivotally connected to each other at one of their ends, force applying means comprising a piston interconnecting the other ends of said arms for selectively applying any suitable predetermined cutting force to said pipe responsive to a rotation of said ring gear relative to said pipe, and means for rotatably driving said ring gear to cause said cutting force to girdle said pipe.

10. The device of claim 9 and means for releasing said force applying means when said cutting force exceeds said predetermined amount.

11. The device of claim 9 and means for fixing the cutting angle of said blade with respect to the axis of said frame.

12. The device of claim 9 and roller means mounted on each of said arms diametrically opposite each other and in line with said blade.

13. The device of claim 9 and compound roller means mounted on said one arm, said roller means having a first periphery for rolling on the outside circumference of said pipe and a second periphery shaped to produce reciprocating linear motion, and means responsive to said linear motion for incrementally advancing said blade to deepen the cut.

14. The device of claim 9 and clamp means for clamping said frame around the outside circumference of a pipe, said clamp means comprising a plurality of individual clamps for radially advancing or retracting in said frame, to grip or release a pipe, and power assist means for so advancing or retracting said clamps.

15. The device of claim 14 and means associated with at least one of said clamp means for selectively adapting said frame to fit over any pipe of a variety of different diameters.

16. A pipe cutting device comprising a two-arm system having associated therewith means for providing a cutting feed force sufficient to cut without imparting excessive loads to the machine as a whole, a blade, said force providing means including a blade holder means and one roller mounted on one of said arms for radially advancing said blade relative to said arm responsive to the rotation of said one roller, a second roller mounted on the other of said arms, said one roller being mounted on said one arm and at a position which is 180° opposite to said second roller mounted on the other of said arms, cylinder means joining said arms and pressurized to a point where there is an equal force acting on both of said rollers to hold them against the periphery of said pipe while under normal cutting conditions, and ring gear means for pulling the two arms around the pipe, whereby there is no excessive loading of the gear against the rollers and an out-of-round condition encountered by the first roller causes said pressurized cylinder to elongate enough to prevent cutting which is different cutting than in normally round sections.

17. The device of claim 16 and means responsive to blade pressure for causing the blade to ride up and thereby remove the first roller from contact with the pipe, said blade holder means being responsive to said removal of said roller from such contact for stopping the radial advance of the blade relative to said arm, thus allowing the tool to adjust itself to the cutting force necessary.

* * * * *